United States Patent

[19]

Maine

[11] 3,736,991
[45] June 5, 1973

[54] DRILLING ATTACHMENT FOR CHAIN SAW

[76] Inventor: Nelson D. Maine, Church Street, Hillsborough, N.H.

[22] Filed: July 23, 1971

[21] Appl. No.: 165,667

[52] U.S. Cl. ....................173/29, 408/20, 144/104
[51] Int. Cl. ................................................B27g 17/00
[58] Field of Search........................408/124, 239, 20; 29/560; 143/32 M; 144/35 A, 104; 279/83; 173/29, 46

[56] References Cited

UNITED STATES PATENTS

| | | | |
|---|---|---|---|
| 3,073,193 | 1/1963 | Grant | 143/32 M |
| 2,714,026 | 7/1955 | Schultz | 279/83 |
| 2,526,131 | 10/1950 | Harnish et al. | 408/124 |
| 2,783,796 | 3/1957 | Kroll | 144/35 A |

*Primary Examiner*—Andrew R. Juhasz
*Assistant Examiner*—Z. R. Bilinsky
*Attorney*—Frederick D. Goode

[57] ABSTRACT

This disclosure describes a tool holding attachment for accommodating a drill or other tool, which attachment is adapted for securing to the exposed clutch member of a portable powered chain saw, thus converting such a saw, for example, to a portable powered drill which can bore large diameter holes in a relatively short period of time.

3 Claims, 7 Drawing Figures

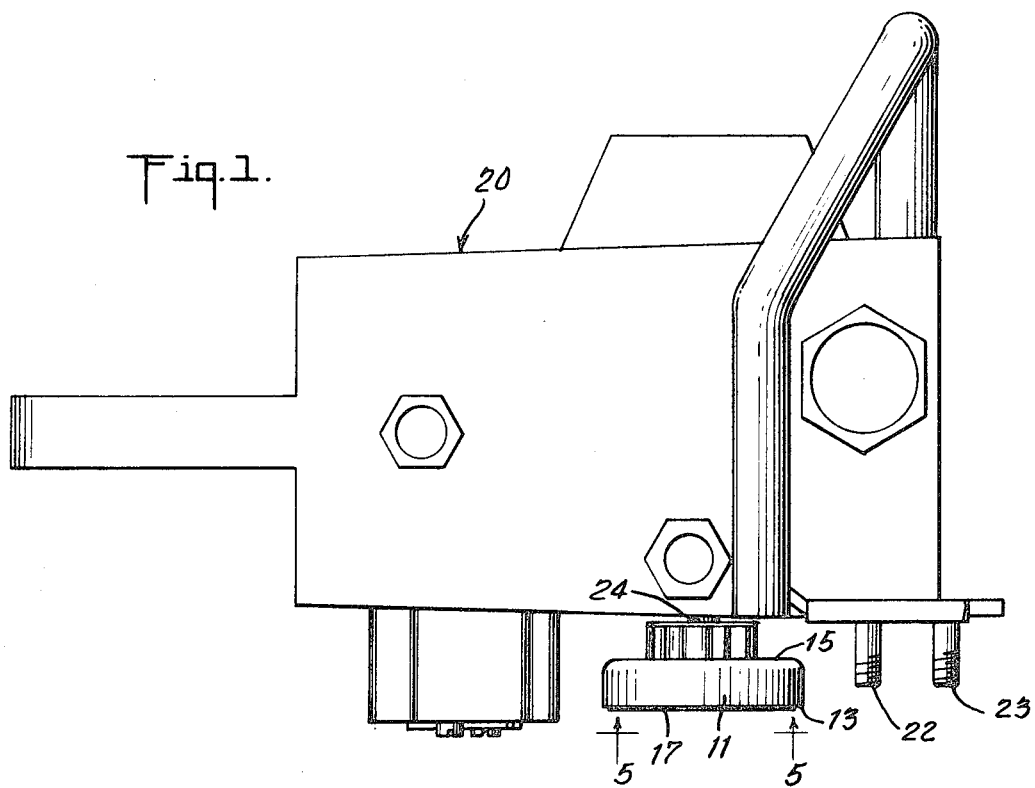
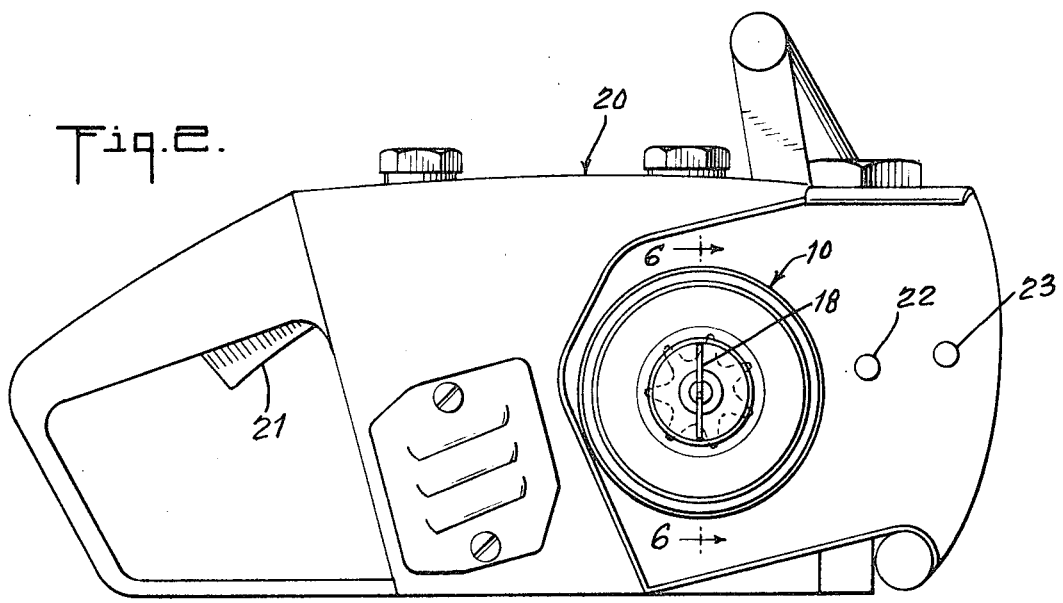

Patented June 5, 1973
3,736,991
2 Sheets-Sheet 2
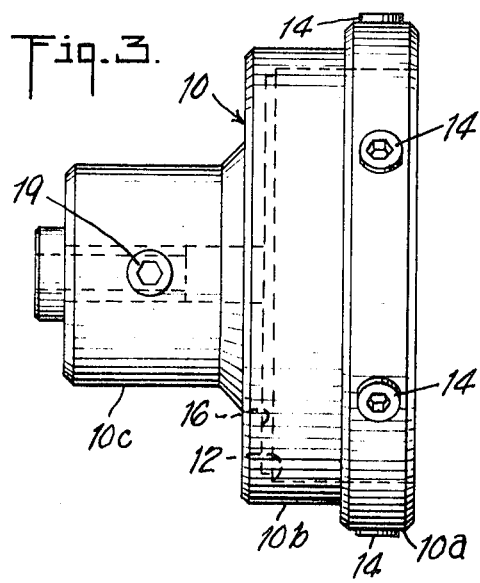
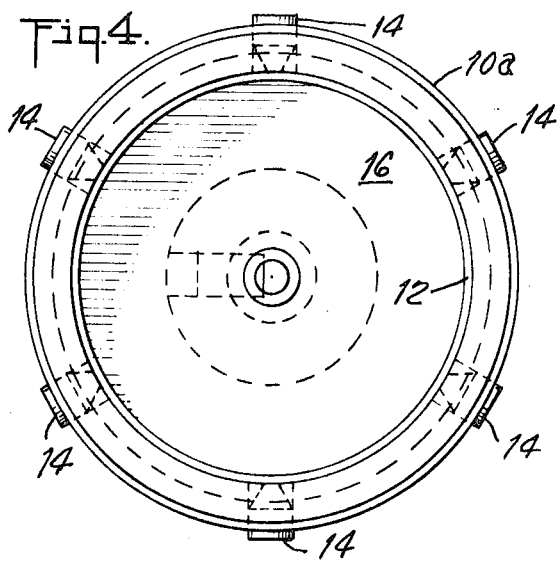
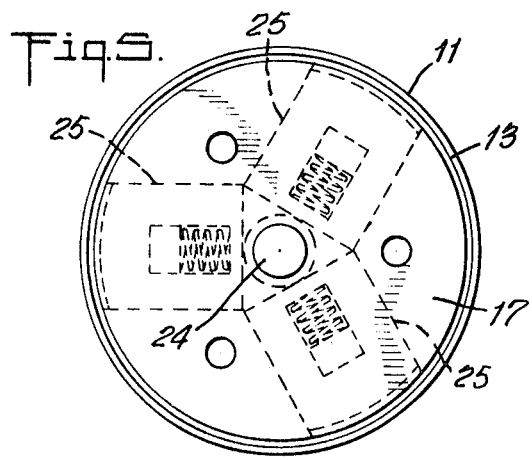
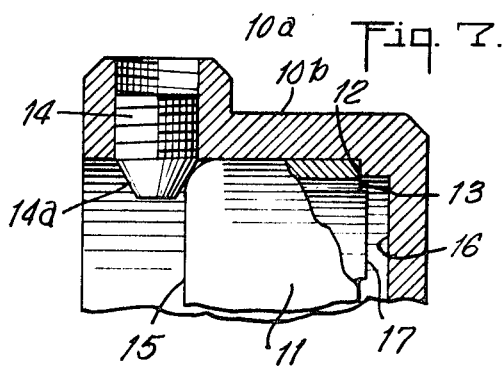
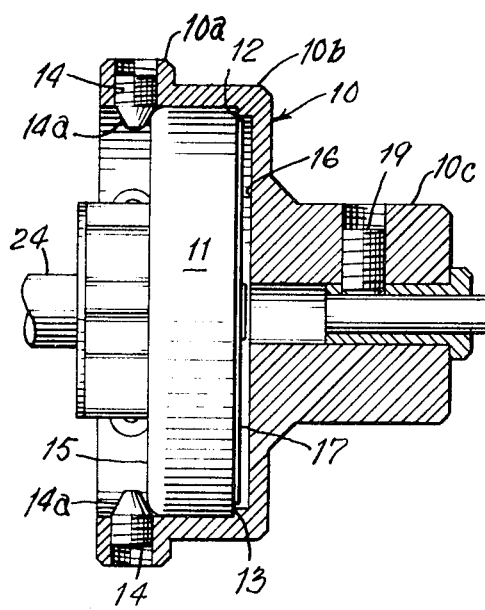
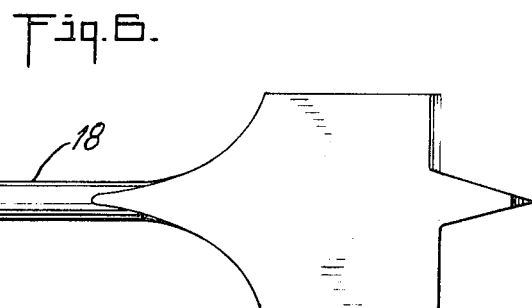
INVENTOR
NELSON D. MAINE

DRILLING ATTACHMENT FOR CHAIN SAW

This invention relates to a drilling adapter or a so called boring-bar attachment adapted to be operatively connected to a clutch member on the side of a portable power chain saw.

The purpose of this invention is to provide an attachment whereby a portable power chain saw may be easily and effectively converted by the use of the herein disclosed attachment into a power drill.

There are many occasions where the use of a power drill in areas where electricity is not available would be very useful, as, for example, in tapping maple sugar trees preparatory to collecting maple sap. The tapping or boring of these trees is now customarily done either manually or in some cases an electric generator carried on a sled is hauled through the woods to provide the necessary power for driving an electric drill. None of these current methods, however, is very satisfactory.

My invention overcomes these prior art shortcomings by providing an attachment for mounting on the drive clutch member of a portable power chain saw following the removal of the chain.

One of the many objects of this invention is to provide an apparatus for mounting to the clutch of a portable power chain saw and which is adapted for receiving and carrying an auger or other form of portable tool.

Another object of this invention is to provide a drilling attachment for portable power chain saws wherein a drill or other form of tool may be readily powered and controlled in the same manner as the chain.

A further object of this invention is to provide a boring attachment to a portable power chain saw by which relatively large holes may be bored into trees or logs in a very short time.

With these and other objects in view, reference is now had to the accompanying drawings which illustrate a preferred embodiment of my invention and wherein:

FIG. 1 shows a top plan view of the motor portion of a portable power chain saw with the chain removed;

FIG. 2 illustrates a side elevation view of FIG. 1 showing the clutch member attached;

FIG. 3 illustrates a side elevation view of my adapter;

FIG. 4 shows a right hand elevation view of FIG. 3;

FIG. 5 shows a front elevation view of the motor clutch member taken on line 5—5 of FIG. 1;

FIG. 6 illustrates a partially sectioned side elevation view of my drilling adapter taken on line 6—6 of FIG. 2 shown carrying a drill bit and being securely mounted in operative relation to the motor clutch member; and FIG. 7 shows in partial enlarged detail the securing and abutting relation of the drilling adapter and motor clutch member illustrated in FIG. 6.

Referring now with greater particularity to the drawings, my drilling adapter as illustrated in FIGS. 3, 4 and 6 is comprised of an annular housing 10 having three stepped diameter portions 10a, 10b and 10c. As seen in FIG. 6, this annular housing 10 has its inside diameter so dimensioned with respect to the outside diameter of clutch member 11 that it can be slipped over the clutch member in face to face contact. The interior of housing 10 also carries an annular lip portion 12 against which the annular face 13 of clutch member 11 abuts.

Referring further to FIGS. 3 and 6, portion 10a carries a plurality of threaded apertures for accommodating a corresponding number of set-screws 14 disposed about the circumference thereof. As more clearly seen in FIGS. 6 and 7, once housing 10 is slipped over clutch 11, set-screws 14 are tightened so that their cone-shaped leading end portion 14a is brought into engagement against the rear annular surface 15 of clutch 11, thus driving annular clutch face 13 into forcible engagement against the surface of annular lip 12 in housing 10.

The interior face 16 of housing 10 is sufficiently recessed below the surface of lip 12 so as to avoid any interfering contact with the face 17 of clutch 11. It should be obvious in light of the foregoing that the surface of lip 12 and the corresponding abutting surface of clutch face 13 should be respectively flat and parallel in order that the housing 10 will be coaxial with clutch member 11 and run true therewith. As also shown in FIG. 6, the portion 10c is adapted to receive a tool, such as an auger 18 which is secured in position by set-screw 19.

In operation, a typical portable power chain saw motor 20 as shown in FIGS. 1 and 2, has its chain (not shown) removed from threaded studs 22, 23. A trigger type speed control 21, shown in FIG. 2, is operator actuated and controls the speed of drive shaft 24, which in turn controls the engagement and disengagement of centrifugally operated clutch member 11 by means of resiliently biased clutch throw-out members 25 which are rotatably driven by motor drive shaft 24, as shown in FIG. 5. Because this form of clutch is so well known in the prior art, no particular explanation of the details of its operation appear to be necessary other than to indicate that as speed control 21 is advanced to increase the speed of drive shaft 24, clutch throw-out members 25 are centrifugally thrown out against the interior of clutch member 11 and, accordingly, cause it to rotate. Likewise, as speed control 21 is retarded, throw-out members 25 are retracted out of contact with clutch member 11 and, accordingly, even though motor drive shaft 24 continues to rotate at an idling speed, clutch member 11 is not driven. Thus, with the assembly of housing 10 together with augur 18, mounted in clutch member 11, as shown in FIG. 6, the chain saw motor may be operated to drive augur 18 in the same manner as is conventionally employed to control and operate a powered chain saw.

The important aspects of this invention relate to the necessity of providing an annular lip 12 for the corresponding annular clutch face 13 to come into forcible contact with so that they will both rotate and coact as an integral unit, and, further, to provide a spatial clearance for clutch face plate 17.

It should now be apparent in light of the foregoing that I have provided a useful device for increasing the versatility of a conventional portable power chain saw by the use of a conversion device for carrying an auger or other suitable tool.

The particular embodiment of the invention herein chosen for illustration and description is exemplary only and it will, accordingly, be understood that various changes in the details, materials, and arrangements of parts herein described and illustrated may be made by those skilled in the art within the principles and scope of the invention as expressed in the appended claims.

Having thus described my invention, I claim:

1. In a portable power chain saw from which the chain member has been removed leaving an exposed cylindrically shaped centrifugal clutch member, the combination therewith of a boring attachment comprising:
a. An annular housing member dimensioned for coaxial, slidable contact over the outer peripheral surface of the clutch member;
b. an annular lip portion interiorly of said housing adapted for receiving the corresponding annular face portion of the clutch member in abutting relation;
c. means forcibly maintaining said annular housing and the clutch member in fixed and immovable abutting contact relative to one another; and
d. means for receiving and holding a tool member in said annular housing.

2. The structure of claim 1 further comprising a recessed surface in said housing below said lip portion whereby to afford spatial clearance to avoid any interfering contact with the face portion of the clutch member.

3. The structure of claim 2 wherein said means forcible maintaining said annular housing and clutch member in fixed and immovable abutting contact comprises a plurality of cone-shaped surfaces carried by said annular housing and being rotatably advanceable against the clutch member surface opposite the annular face portion.

* * * * *